US012718708B2

(12) United States Patent
Ohira

(10) Patent No.: US 12,718,708 B2
(45) Date of Patent: Aug. 25, 2026

(54) OPTICAL PLANETARIUM AND PLANETARIUM SYSTEM HAVING SAME

(71) Applicant: Ohira Tech Ltd., Yokohama (JP)

(72) Inventor: Takayuki Ohira, Yokohama (JP)

(73) Assignee: OHIRA TECH LTD., Kanagawa (JP)

( * ) Notice: Subject to any disclaimer, the term of this patent is extended or adjusted under 35 U.S.C. 154(b) by 672 days.

(21) Appl. No.: 17/924,887

(22) PCT Filed: Jul. 2, 2021

(86) PCT No.: PCT/JP2021/025082
§ 371 (c)(1),
(2) Date: Nov. 11, 2022

(87) PCT Pub. No.: WO2022/019086
PCT Pub. Date: Jan. 27, 2022

(65) Prior Publication Data

US 2023/0196946 A1 Jun. 22, 2023

(30) Foreign Application Priority Data

Jul. 20, 2020 (JP) ................................ 2020-123748

(51) Int. Cl.
*G09B 27/04* (2006.01)
*G03B 21/26* (2006.01)

(52) U.S. Cl.
CPC ............ *G09B 27/04* (2013.01); *G03B 21/26* (2013.01)

(58) Field of Classification Search
None
See application file for complete search history.

(56) References Cited

U.S. PATENT DOCUMENTS 3,571,954 A * 3/1971 Frank ..................... G09B 27/02 434/286
3,863,363 A 2/1975 Miyajima

FOREIGN PATENT DOCUMENTS

| | | | |
|---|---|---|---|
| FR | 2687822 A1 | 8/1993 | |
| GB | 191312091 A | 5/1913 | |
| JP | S44-007176 B | 3/1969 | |
| JP | 60230183 A | 11/1985 | |
| JP | S60230183 A * | 11/1985 | ............ G09B 27/00 |

(Continued)

OTHER PUBLICATIONS

Observation against a basic Japanese patent No. 2020-123748 submitted on Jun. 17, 2022.

(Continued)

*Primary Examiner* — Bao-Luan Q Le
*Assistant Examiner* — Danell L Owens
(74) *Attorney, Agent, or Firm* — Wood, Phillips, Katz, Clark & Mortimer

(57) ABSTRACT

An optical planetarium includes a projector configured to project images of stars; a diurnal-axis support mechanism configured to allow the projector to rotate about a diurnal axis; a latitude-axis support mechanism configured to allow the projector to rotate about a latitude axis that is orthogonal to the diurnal axis; an azimuth-axis support mechanism configured to allow the projector to rotate about an azimuth axis that is set vertically; and a latitude-axis inclination angle changing mechanism configured to allow an angle between the latitude axis and a horizontal plane to be changed within a predetermined range.

3 Claims, 7 Drawing Sheets

(56) References Cited

FOREIGN PATENT DOCUMENTS

| | | | |
|---|---|---|---|
| JP | 4-204586 | A | 7/1992 |
| JP | 11-102155 | A | 4/1999 |
| JP | 2002-328597 | A | 11/2002 |
| JP | 2003-114612 | A | 4/2003 |
| JP | 2003262915 | A | 9/2003 |
| JP | 2008-276102 | A | 11/2008 |
| JP | 2008-288714 | A | 11/2008 |
| JP | 2009-169059 | A | 7/2009 |
| JP | 2012-194579 | A | 10/2012 |
| JP | S44-007176 | | 6/2020 |
| JP | 2020123748 | A | 6/2022 |

OTHER PUBLICATIONS

Design, Issue 22, Nov. 1, 2019, DIA, Optical Planetarium Projector.
International Search Report for corresponding PCT Application No. PCT/JP2021/025082 mailed Sep. 14, 2021.

* cited by examiner (Prior Art)

(Prior Art)

OPTICAL PLANETARIUM AND PLANETARIUM SYSTEM HAVING SAME

TECHNICAL FIELD

The present invention relates to an optical planetarium and a planetarium system having the same.

BACKGROUND ART

1. Modern Three-Axis Type

A configuration of a representative optical planetarium projector which is currently most widespread is illustrated in FIG. 6. An optical planetarium 110 includes a north-sky projector 111*a* and a south-sky projector 111*b*, each having a hemispherical shape, as a projector 112 for projecting fixed stars. The north-sky projector 111*a* and the south-sky projector 111*b* are provided so as to face away from each other. The north-sky projector 111*a* and the south-sky projector 111*b* are referred to as "star ball 111". The star ball 111 is rotatable about a diurnal axis 181. The star ball 111 is supported on a fork mount 122 so as to be rotatable about a latitude axis 182 that is set horizontally and is orthogonal to the diurnal axis 181. When the star ball 111 is rotated about the latitude axis 182, an inclination angle between the diurnal axis 181 and a horizontal plane can be changed as desired.

On the star ball 111, stars projected from the star ball 111 are arranged on coordinates referring equatorial coordinates based on a rotation axis of the Earth so that the diurnal axis 181 points to current north celestial pole and south celestial pole. Thus, when the star ball 111 is rotated about the diurnal axis 181, diurnal motion of stars is reproduced on a dome screen. Further, when the star ball 111 is rotated about the latitude axis 182, the optical planetarium 110 can reproduce a starry sky seen from an observation site at any latitude on the Earth.

Instead of a traditional concentrical arrangement of audience seats toward a center of a dome, a unidirectional arrangement of audience seats has become a mainstream for recent planetariums. Such an arrangement allows easy alignment of a line of sight of a presenter and lines of sight of audience. Thus, the presenter can give correct presentation on celestial bodies and objects to all the audience. Meanwhile, the presenter and the audience face forward in a specific direction, and thus have a difficulty in seeing a side opposite to a front side. For example, when the south is set as the front side, the presenter and the audience are both required to turn around for explanation of celestial bodies or objects in the north. To eliminate such inconvenience, the optical planetarium 110 has an azimuth axis 183 about which the optical planetarium 110 is allowed to rotate as a whole in a horizontal direction. The type capable of freely changing a direction corresponding to the front side in such a manner has been widespread. In recent years, as described above, the optical planetarium 110 having three axes, that is, the diurnal axis 181, the latitude axis 182, and the azimuth axis 183 for reproducing movement of celestial bodies such as fixed stars has been commonly used. Such a type of optical planetarium 110 is referred to as "modem three-axis type."

2. Classical Four-Axis Type

Hitherto, an optical planetarium 210 as illustrated in FIG. 7 has been commonly used. The optical planetarium 210 has a precession axis 285 in addition to a diurnal axis 281 and a latitude axis 282 so as to reproduce a change in the rotation axis of the Earth over a long period of time, which is referred to as precession motion. Such a type of optical planetarium 210 is referred to as "classical three-axis type." A north-sky star ball 211*a* and a south-sky star ball 211*b* are configured to project a starry sky not referring the coordinates based on the rotation axis of the Earth but referring ecliptic coordinates based on an orbital plane of the Earth. The north-sky star ball 211*a* and the south-sky star ball 211*b* are configured so as to be rotatable about the precession axis 285. The precession axis 285 is held by a precession-axis holder 291, and the precession-axis holder 291 as a whole is rotatable about the diurnal axis 281. The precession-axis holder 291 keeps an angle between the diurnal axis 281 and the precession axis 285 at about 23.4°. This angle is an inclination angle of the equator of the Earth with respect to the ecliptic plane. The diurnal axis 281 is held by the latitude axis 282. As in the case of the modern three-axis type, a starry sky seen from an observation site at any latitude can be reproduced by rotating about the latitude axis 282. The classical three-axis type optical planetarium 210 can reproduce not only current movement of stars in which a current northern pole star (a Ursae Minoris: Polaris) is as a northern pole star but also movement of stars, for example, in the future after 11,000 years from today in which Vega in the constellation of Lyra is as a northern pole star, by rotating about the precession axis 285.

Further, there is also known an optical planetarium 210, which corresponds to a classical three-axis type additionally having an azimuth axis 283 for horizontally rotating the optical planetarium 210 as a whole. Such a type of optical planetarium 210 is referred to as "classical four-axis type."

In the classical three-axis type and classical four-axis type optical planetariums 210, the north-sky star ball 211*a* and the south-sky star ball 211*b* are installed on the precession-axis holder 291 in an inclined manner, which may result in a larger device size. The optical planetarium 210 having a large size may obstruct views of the audience. Thus, in recent years, the classical three-axis type and classical four-axis type optical planetariums 210 have been less used, and the modern three-axis type optical planetarium 110 has mainly been used. The modern three-axis type allows the star ball 111 to be provided in a compact manner, and thus the optical planetarium 110 does not obstruct the views of the audience.

The related-art optical planetariums as described above are disclosed in, for example, JP H4-204586 A.

3. Multiaxial Composite Control

The modern three-axis optical planetarium 110 is not able to reproduce precession motion etc. by rotation about one axis. Thus, angles about three axes are controlled by a computer so as to virtually reproduce the precession motion etc. through a three-axis composite motion. In theory, the star ball 111 can have any attitude angle by combining rotations about three axes, that is, the diurnal axis 181, the latitude axis 182, and the azimuth axis 183. Not only the precession motion but also rotational motion about any point on the celestial sphere can be reproduced by accurately controlling the angles about the three axes. Accordingly, for example, a starry sky which can be seen from a planet other than the Earth can be reproduced.

SUMMARY OF INVENTION

In the multiaxial composite control using the modem three-axial type, when two axes come closer to each other, for example, when the diurnal axis 181 is aligned with the azimuth axis 183, the degree of freedom in motion is reduced, which may result in failing to appropriately reproduce a starry sky. With four-axis composite motion using the classical four-axis type, such a reduction in the degree of freedom in motion is prevented. Thus, a starry sky can be reproduced with high accuracy. However, the classical four-axis type optical planetarium 210 becomes complex and is increased in size as compared to the modern three-axis type.

The present invention has an object to allow a device to be compact and allow a wide variety of starry skies to be appropriately reproduced in an optical planetarium.

According to one aspect of the present invention, there is provided an optical planetarium, including: a projector configured to project images of stars; a diurnal-axis support mechanism configured to allow the projector to rotate about a diurnal axis; a latitude-axis support mechanism configured to allow the projector to rotate about a latitude axis that is orthogonal to the diurnal axis; an azimuth-axis support mechanism configured to allow the projector to rotate about an azimuth axis that is set vertically; and a latitude-axis inclination angle changing mechanism configured to allow an angle between the latitude axis and a horizontal plane to be changed within a predetermined range.

According to the present invention, it is possible to allow the device to be compact and allow a wide variety of starry skies to be appropriately reproduced in the optical planetarium.

DESCRIPTION OF EMBODIMENTS

[Configuration of Optical Planetarium]

One embodiment is described with reference to the drawings. An optical planetarium according to this embodiment is a projector with four axes achieved by additionally providing a swing axis for inclining a latitude axis within a given range to a modern three-axis type optical planetarium. Four axes allow appropriate reproduction of precession motion or rotational motion about any point on a celestial sphere, such as a starry sky that can be seen from a planet other than the Earth. Further, a configuration according to this embodiment allows a device to be compact. A type of optical planetarium according to this embodiment is referred to as "new four-axis type".

Figure 1:
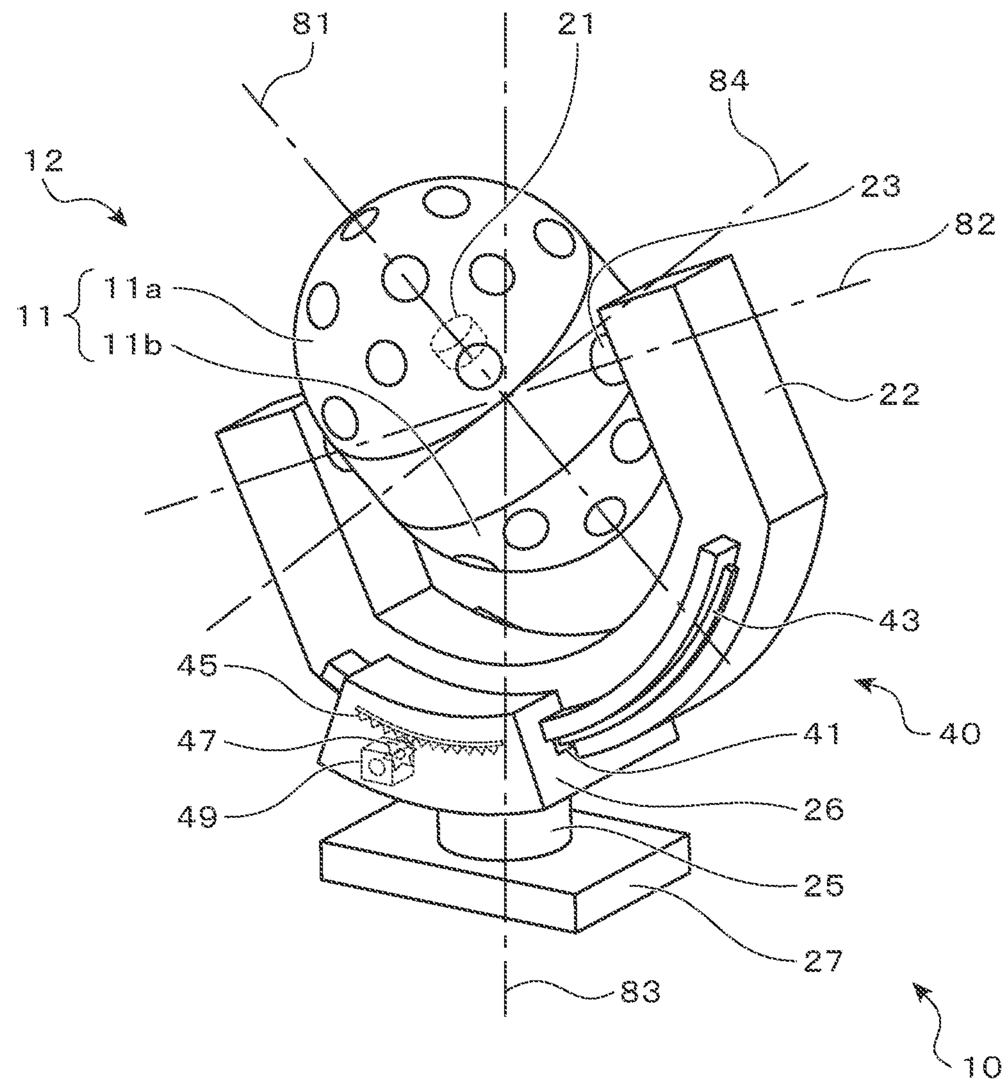
FIG. 1 is a perspective view for illustrating an outline of a configuration example of an optical planetarium according to one embodiment.

An outline of a configuration example of an optical planetarium 10 according to this embodiment is illustrated in FIG. 1. As illustrated in FIG. 1, like the related-art modem three-axis type optical planetarium 110, the optical planetarium 10 according to this embodiment includes a projector 12 configured to project images of stars. In the example illustrated in FIG. 1, the projector 12 includes a star ball 11. The star ball 11 includes a north-sky projector 11*a* and a south-sky projector 11*b*, each having a hemispherical shape. The north-sky projector 11*a* and the south-sky projector 11*b* are mounted so as to face away from each other. The star ball 11 is supported by a diurnal-axis support mechanism 21 so as to be rotatable about a diurnal axis 81. The diurnal-axis support mechanism 21 includes, for example, a shaft member, a bearing, a motor, a reduction gear, and an encoder. The shaft member extends along the diurnal axis 81. The bearing receives the shaft member. The motor and the reduction gear rotate the shaft member. The encoder detects a rotational angle. A configuration of the diurnal-axis support mechanism 21 is not limited to that described above, and may be any configuration. For example, the diurnal-axis support mechanism 21 may include an annular rail and a slider. The slider is provided on a peripheral edge portion of a disc plate, and slides relative to the rail.

The star ball 11 is supported on a fork mount 22 by a latitude-axis support mechanism 23 so as to be rotatable about a latitude axis 82 that is orthogonal to the diurnal axis 81. The latitude-axis support mechanism 23 may also have a variety of configurations. The latitude-axis support mechanism 23 includes, for example, a shaft member, a bearing, a motor, a reduction gear, and an encoder. The optical planetarium 10 is configured to be able to freely change an inclination angle between the diurnal axis 81 and a horizontal plane through rotation of the star ball 11 about the latitude axis 82.

Like the related-art modern three-axis type optical planetarium 110, on the star ball 11, stars projected from the star ball 11 are arranged on coordinates referring equatorial coordinates based on a rotation axis of the Earth. When the star ball 11 rotates about the diurnal axis 81, diurnal motion of stars is reproduced on a dome screen. Further, when the star ball 11 rotates about the latitude axis 82 that lies horizontally, a starry sky seen from an observation site at any latitude on the Earth can be reproduced.

Further, the optical planetarium 10 is configured to rotate about an azimuth axis 83 that is set vertically so that the optical planetarium 10 is rotated in a horizontal direction as a whole. Specifically, the fork mount 22 is supported by an azimuth-axis support mechanism 25 so as to be rotatable about the azimuth axis 83 with respect to a base 27 fixed on a ground. The azimuth-axis support mechanism 25 may also have a variety of configurations. The azimuth-axis support mechanism 25 includes, for example, a shaft member, a bearing, a motor, a reduction gear, and an encoder. When the fork mount 22 rotates about the azimuth axis 83, a direction corresponding to a front side can be changed as desired. The diurnal axis 81, the latitude axis 82, and the azimuth axis 83 are set so as to cross each other at a center of the star ball 11.

The optical planetarium 10 according to this embodiment further includes a latitude-axis inclination angle changing mechanism 40 configured to be able to change an angle between the latitude axis 82 and the horizontal plane within a predetermined range. In particular, the optical planetarium 10 according to this embodiment has a swing axis 84 about which the latitude axis 82 rotates. The swing axis 84 is set so as to be orthogonal to the azimuth axis 83 and the latitude axis 82 at the center of the star ball 11.

The fork mount 22 in this embodiment has an arc-like shape sharing a center with the star ball 11 so as to allow the latitude axis 82 to rotate about the swing axis 84. A rail 41 having an arc-like shape that shares a center with the star ball 11 is provided on a support part 26 which is provided on the azimuth-axis support mechanism 25 and rotates about the azimuth axis 83. The fork mount 22 includes a slider 43 configured to slide on the rail 41. The fork mount 22 is supported on the support part 26 provided on the azimuth-axis support mechanism 25 through intermediation of the rail 41 and the slider 43. It is preferred that cross-roller bearings be provided to a portion corresponding to the rail 41 and the slider 43. A rack gear 45 having an arc-like shape is provided to the fork mount 22 so as to extend along the rail 41 having an arc-like shape and the slider 43. A pinion gear 47 that drives the rack gear 45 is provided in the support part 26. The pinion gear 47 is driven by a swing-axis motor 49. An inclination angle of the fork mount 22 is controlled through an operation of the swing-axis motor 49 as desired. A configuration of the latitude-axis inclination angle changing mechanism 40 described here is an example. Other configurations may be used for the latitude-axis inclination angle changing mechanism 40 as long as the latitude-axis inclination angle changing mechanism 40 has the same functions. A movable range of the fork mount 22 about the swing axis 84 is, for example, ±30°, but is not limited thereto. When the movable range is ±30°, the star ball 11 can rotate within a range of ±30° about the swing axis 84 passing through the center of the star ball 11.

Figure 2:
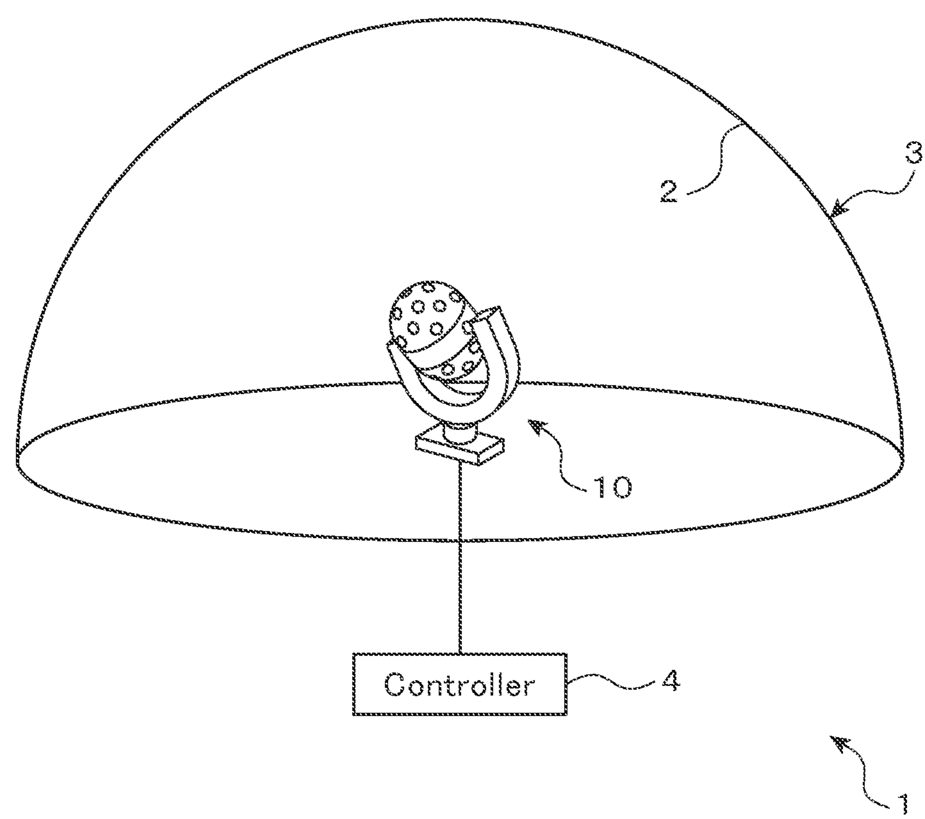
FIG. 2 is a schematic view for illustrating an outline of a configuration example of a planetarium system according to one embodiment.

As illustrated in FIG. 2, in a planetarium system 1 according to this embodiment, the optical planetarium 10 described above is arranged at a center of a dome 3 having a hemispherical shape. The dome 3 has an inner surface serving as a screen 2. The optical planetarium 10 projects images of fixed stars onto the screen 2 on the inner surface of the dome 3. An operation of the optical planetarium 10 for the projection is controlled by a controller 4. The control includes that of the rotation of the star ball 11 about the diurnal axis 81, the latitude axis 82, the azimuth axis 83, and the swing axis 84. The controller 4 includes a computer. The controller 4 includes an integrated circuit such as a central processing unit (CPU), an application specific integrated circuit (ASIC), or a field programmable gate array (FPGA). Further, the controller 4 includes, for example, a read only memory (ROM), a random access memory (RAM), a storage, an input device, a display device, and various interfaces. The controller 4 operates in accordance with a program or hardware.

[Operation of Optical Planetarium]

Figure 6:
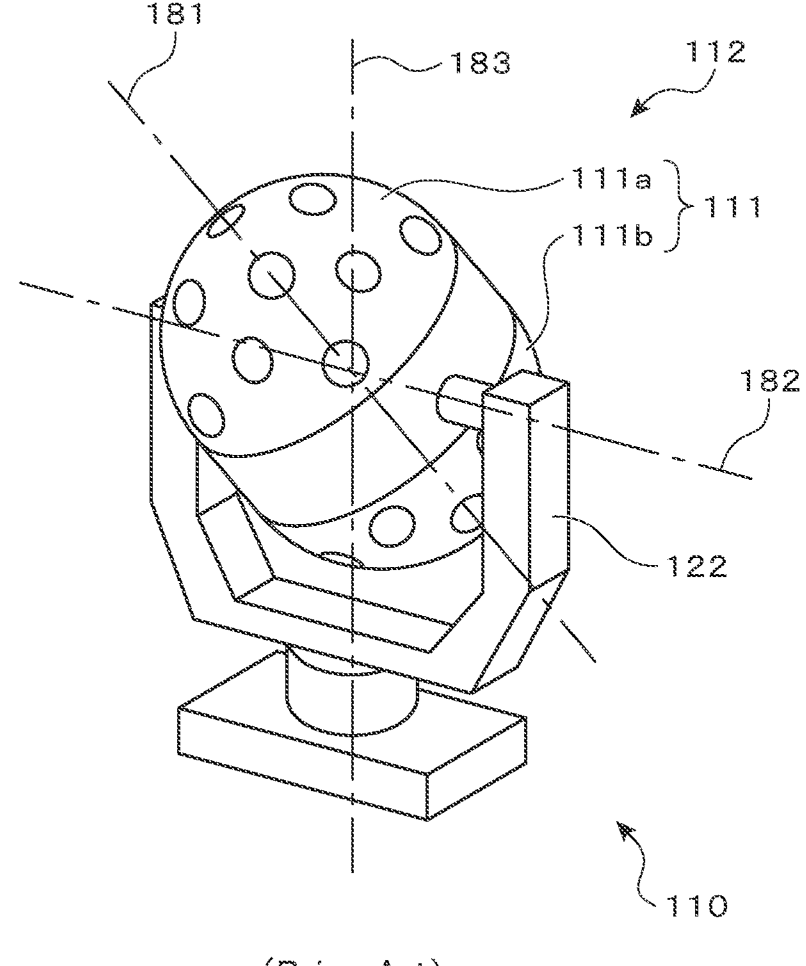
FIG. 6 is a perspective view for illustrating an outline of a configuration example of a modern three-axis type optical planetarium.

An operation of the new four-axis type optical planetarium 10 according to this embodiment is now described in comparison with an operation of the related-art modem three-axis type optical planetarium 110, which has been described with reference to FIG. 6.

In both of the star ball 11 of the new four-axis type optical planetarium 10 according to this embodiment and the star ball 111 of the related-art modem three-axis type optical planetarium 110, stars are arranged on coordinates based on the equatorial coordinates having a current rotation axis of the Earth as a reference. Specifically, for example, a star that is currently located at a celestial north pole is arranged on the diurnal axis 81 in the north-sky projector 11*a*. More specifically, a northern pole star (α Ursae Minoris: Polaris) is arranged in the vicinity of the celestial north pole, that is, in the vicinity of the diurnal axis 81 in the north-sky projector 11*a* with an offset of less than 1° from the celestial north pole.

Figure 3:
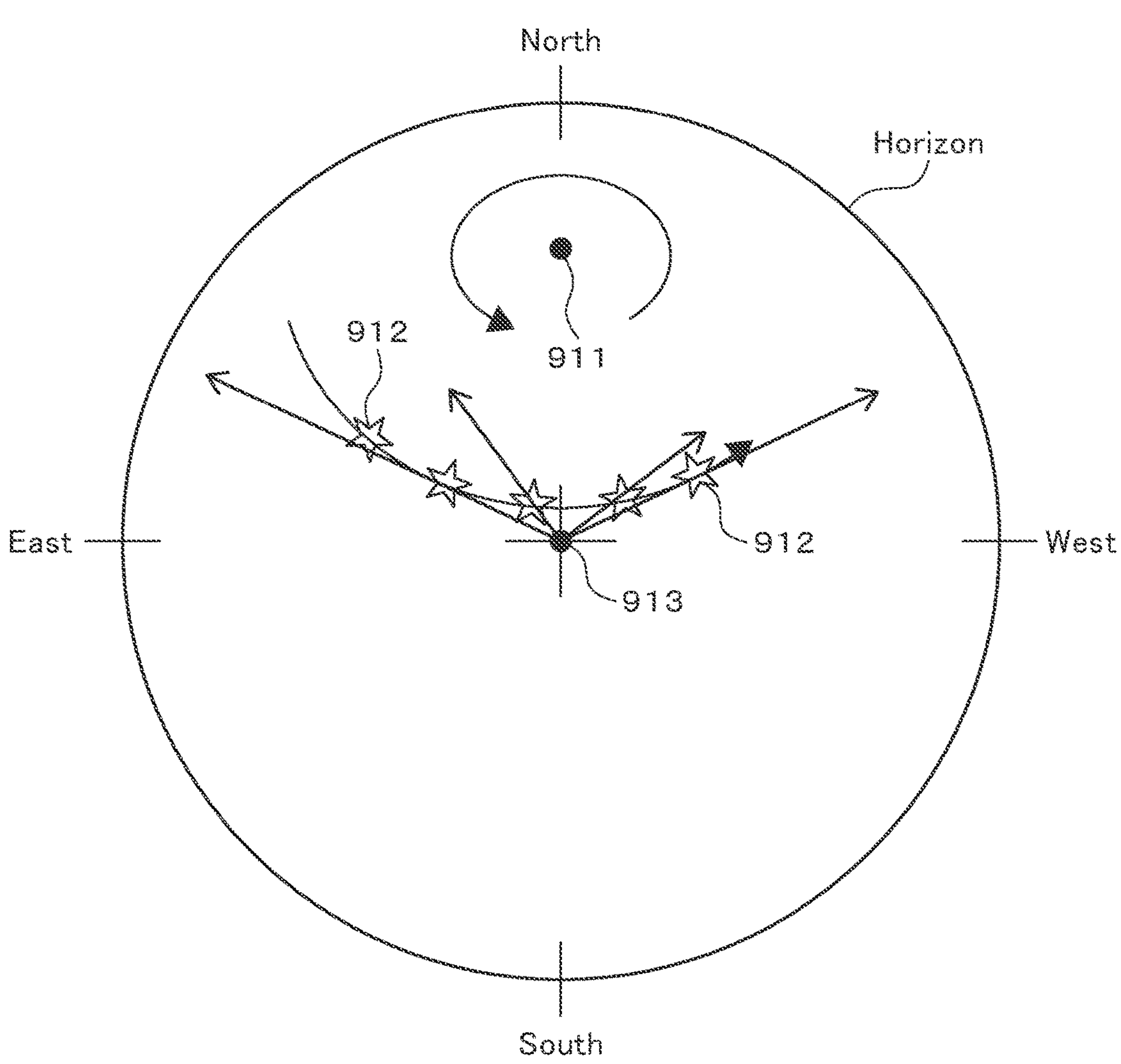
FIG. 3 is a schematic view for explaining reproduction of diurnal motion of a starry sky in the future after 11,000 years from today.

It is now supposed, as an example, a case in which diurnal motion of a starry sky in the future after 11,000 years from today is reproduced. In this case, in a north sky, Vega in the constellation of Lyra is located in the vicinity of the celestial north pole in a north sky although Vega is not located exactly at the celestial north pole. When viewed from a geographical point of a northern latitude of about 37°, a Vega 911 is seen at an altitude of substantially 37° in the north sky and hardly moves from there as illustrated in FIG. 3. A Polaris 912 and the Vega 911 are away from each other by about 52°, and thus the Polaris 912 rises in a northeastern sky and passes near a zenith 913 at a distance of 1° away from the zenith to the north. Other stars also make diurnal motion about the Vega 911.

In reality, Polaris is not located exactly at the celestial north pole even today, and Vega may not be located exactly at the celestial north pole in the future after 11,000 years. For description, however, it is assumed that Polaris is located at the celestial north pole today, Vega is located at the celestial north pole in the future after 11,000 years, and Polaris passes near the zenith.

Consideration is now made on movement of a starry sky, which can be seen from a geographical point at a northern latitude of 37° in the future after 11,000 years, is reproduced through three-axis composite motion with use of the related-art modem three-axis type optical planetarium 110. In this case, the diurnal axis 181 of the optical planetarium 110 points toward the Polaris 912. An angle about the azimuth axis 183 changes in accordance with a direction toward the Polaris 912. When the Polaris 912 is sufficiently far away from the zenith 913, an angular velocity about the azimuth axis 183 is small, causing no problem.

When the Polaris 912 passes near the zenith 913, however, an azimuth angle of the Polaris 912 rapidly changes as indicted by arrows in FIG. 3 although the diurnal motion is not so fast. Accordingly, it is required that the rotation about the azimuth axis 183 be performed at high speed. When the Polaris 912 passes exactly through the zenith 913, a velocity of the passage instantaneously becomes infinite. A point at which the velocity becomes infinite is referred to as "singular point". When the Polaris 912 approaches the zenith 913, it means that an angle between the diurnal axis 181 and the azimuth axis 183 decreases. When an altitude of the Polaris 912 above the horizon is referred to as "a°", the angle between the diurnal axis 181 and the azimuth axis 183 is (90-a)°. In other words, the phenomenon occurs at the singular point due to a decrease in degree of freedom in the motion, which is caused by alignment between the azimuth axis 183 and the diurnal axis 181. This phenomenon is equivalent to a so-called "gimbal lock" state. In an actual operation of the optical planetarium 110, a maximum speed or a maximum acceleration of rotation about a rotation axis is limited. Thus, the optical planetarium 110 fails to precisely follow ideal movement and causes unnatural movement.

Figure 7:
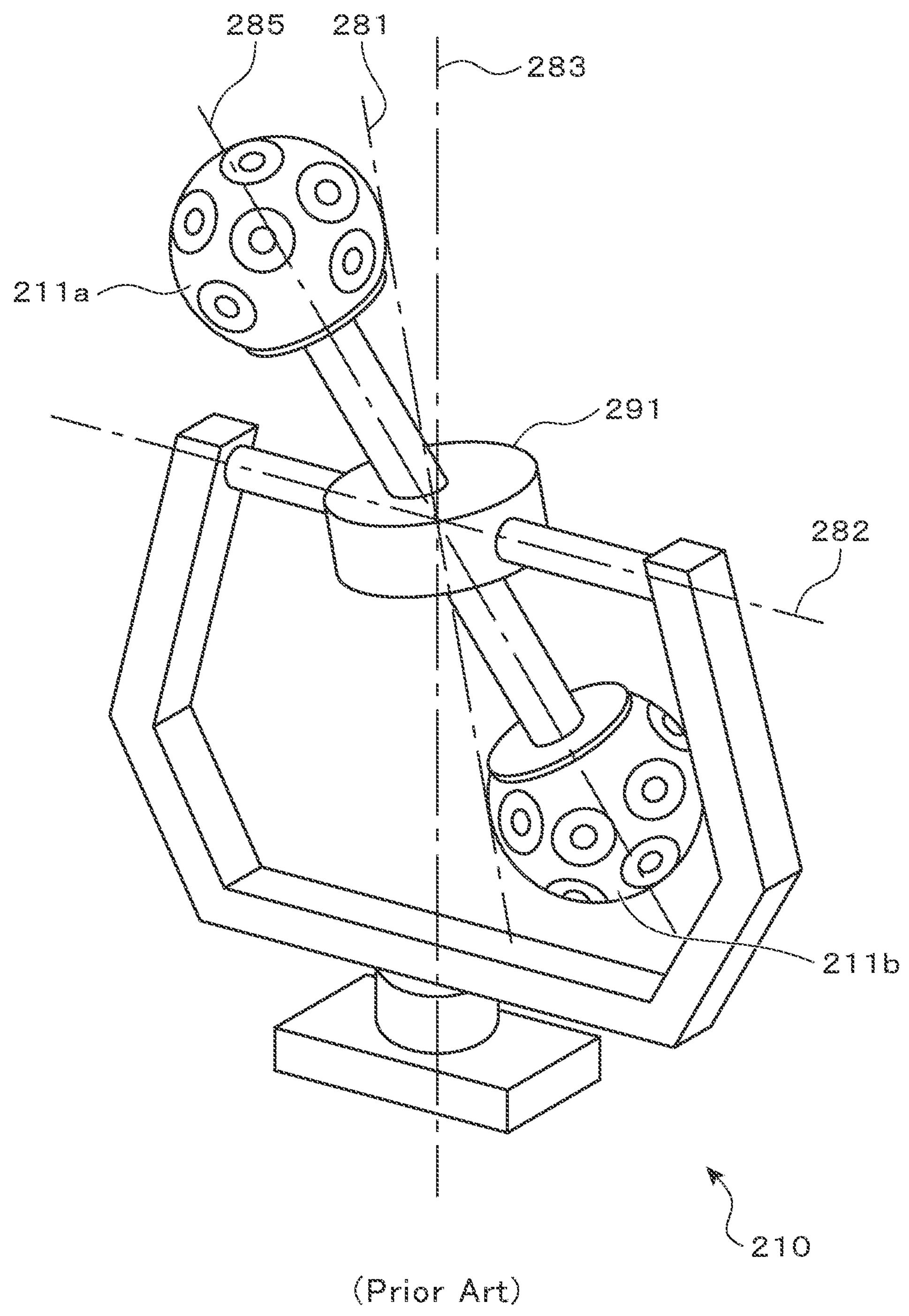
FIG. 7 is a perspective view for illustrating an outline of a configuration example of a classical four-axis type optical planetarium.

With the classical four-axis type optical planetarium 210 which has been described with reference to FIG. 7, the above-mentioned problem can be solved through four-axis composite motion. However, the classical four-axis type optical planetarium 210 has a large size, and thus may, for example, obstruct views of audience.

On the other hand, in the new four-axis type optical planetarium 10 according to this embodiment, rotation about four axes, that is, the diurnal axis 81, the latitude axis 82, the azimuth axis 83, and the swing axis 84 is controlled so as to prevent the diurnal axis 81 and the azimuth axis 83 from coming excessively close to each other. In this manner, the above-mentioned problem which may occur in the related-art modern three-axis type optical planetarium can be prevented.

The new four-axis type optical planetarium 10 according to this embodiment has two control modes, that is, a swing-axis fixed mode and an azimuth-axis fixed mode. In the swing-axis fixed mode, an angle about the swing axis 84 is fixed to a predetermined value, and angles about the diurnal axis 81, the latitude axis 82, and the azimuth axis 83 are calculated so as to control a posture of the star ball 11. When the angle about the swing axis 84 is 0° and the latitude axis 82 lies horizontally, the swing-axis fixed mode is the same as that in the related-art modern three-axis type optical planetarium. In the azimuth-axis fixed mode, an angle about the azimuth axis 83 is fixed to a predetermined value, and the angles about the diurnal axis 81, the latitude axis 82, and the swing axis 84 are calculated so as to control the posture of the star ball 11. It is known that the angles about the axes can be mathematically calculated by, for example, a matrix calculation in each of the modes. The description of the calculation is omitted here.

Generally, the control is performed in the swing-axis fixed mode in which the angle about the swing axis 84 is fixed to 0°, which is an initial value. On the other hand, when the diurnal axis 81 and the azimuth axis 83 are close to each other and the angle between the diurnal axis 81 and the azimuth axis 83 is smaller than a predetermined range, for example, when the altitude of the Polaris 912 exceeds 70°, the control mode is switched to the azimuth-axis fixed mode. Further, in the azimuth-axis fixed mode, when the diurnal axis 81 and the azimuth axis 83 are away from each other and the angle between the diurnal axis 81 and the azimuth axis 83 is larger than a predetermined range, for example, when the altitude of the Polaris 912 is lower than 70°, the control mode is switched to the swing-axis fixed mode.

Switching between the swing-axis fixed mode and the azimuth-axis fixed mode is not always performed based only on the angle between the diurnal axis 81 and the azimuth axis 83 as a reference. For example, switching between the swing-axis fixed mode and the azimuth-axis fixed mode may be performed so that an angular velocity or an angular acceleration of the rotation about the diurnal axis 81 or the azimuth axis 83 is less than a predetermined value. Further, switching between the swing-axis fixed mode and the azimuth-axis fixed mode may be performed through use of both of the angle between the diurnal axis 81 and the azimuth axis 83 and the angular velocity or the angular acceleration of the rotation about the diurnal axis 81 or the azimuth axis 83.

It is preferred that the optical planetarium have a transition mode in which both of the rotation about the azimuth axis 83 and the rotation about the swing axis 84 have an angular velocity being provided so that the switching between the above-mentioned modes is performed smoothly. Specifically, when switching from the swing-axis fixed mode to the azimuth-axis fixed mode is performed, the angular velocity about the azimuth axis 83 is gradually decelerated in the transition mode. When switching from the azimuth-axis fixed mode to the swing-axis fixed mode is performed, the angular velocity about the swing axis 84 is gradually decelerated in the transition mode. Further, when switching from the azimuth-axis fixed mode to the swing-axis fixed mode is performed, it is preferred that the angle about the swing axis 84 be gently returned to 0°, which is the initial value. Further, there is a case in which an angle about the swing axis 84 is required to be larger or smaller than limit values of the device, e.g., ±30°, depending on a control state. In this case, the angle about the swing axis 84 is fixed to a maximum value of the angle, and the control mode is switched to the swing-axis fixed mode. Also in this case, it is preferred that the angular velocity about the swing axis 84 be gradually decreased so as to stop the rotation before the angle reaches ±30°.

Figure 4:
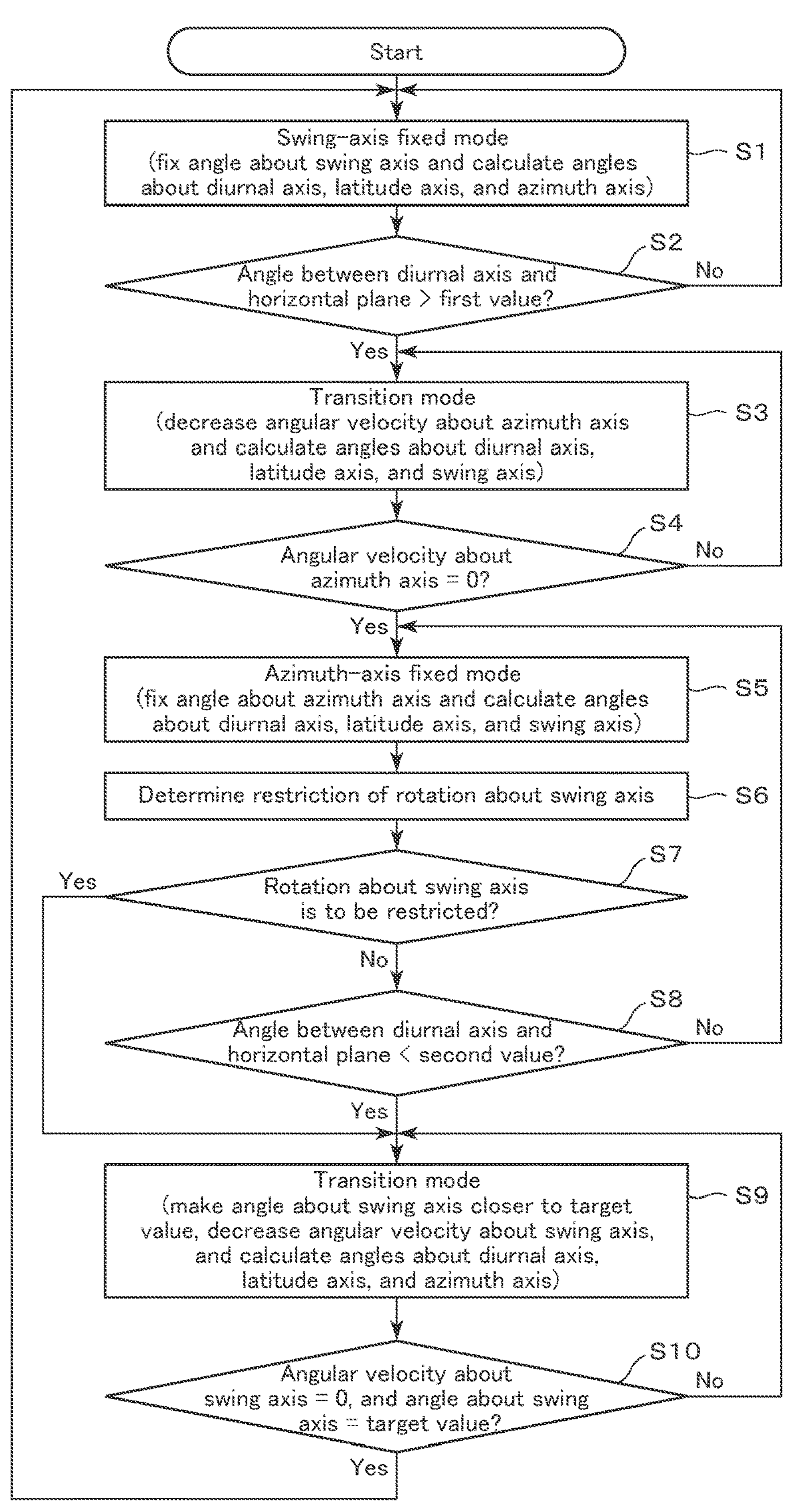
FIG. 4 is a flowchart for illustrating an example of control of the optical planetarium according to one embodiment.

An example of the control according to this embodiment is described with reference to a flowchart of FIG. 4.

In Step S1, the controller 4 controls the operation of the optical planetarium 10 in the swing-axis fixed mode. Specifically, the controller 4 fixes the angle about the swing axis 84 and calculates the angles about the diurnal axis 81, the latitude axis 82, and the azimuth axis 83 so as to reproduce a target starry sky. The controller 4 controls the rotation about the diurnal axis 81, the latitude axis 82, and the azimuth axis 83 based on the obtained values.

In Step S2, the controller 4 determines whether or not the angle between the diurnal axis 81 and the horizontal plane is larger than a predetermined first value, for example, 70°. When the angle between the diurnal axis 81 and the horizontal plane is not larger than the first value, the process returns to Step S1. Then, the control in the swing-axis fixed mode is continued. On the other hand, when the angle between the diurnal axis 81 and the horizontal plane is larger than the first value, the process proceeds to Step S3.

In Step S3, the controller 4 controls the operation of the optical planetarium 10 in the transition mode so as to switch the control for the operation of the optical planetarium 10 to that in the azimuth-axis fixed mode. Specifically, the controller 4 determines the angle about the azimuth axis 83 so as to gradually decrease the angular velocity of the rotation about the azimuth axis 83 and calculates the angles about the diurnal axis 81, the latitude axis 82, and the swing axis 84 for the reproduction of the target starry sky based on the angle about the azimuth axis 83. The controller 4 controls the rotation about the diurnal axis 81, the latitude axis 82, the azimuth axis 83, and the swing axis 84 based on the obtained values.

In Step S4, the controller 4 determines whether or not the angular velocity of the rotation about the azimuth axis 83 has become equal to zero, specifically, the rotation about the azimuth axis 83 has stopped. When the rotation about the azimuth axis 83 has not stopped, the process returns to Step S3. Then, the control in the transition mode is continued. On the other hand, when the rotation about the azimuth axis 83 has stopped, the process proceeds to Step S5.

In Step S5, the controller 4 controls the operation of the optical planetarium 10 in the azimuth-axis fixed mode. Specifically, the controller 4 fixes the angle about the azimuth axis 83 under the state in which the rotation about the azimuth axis 83 is stopped, and calculates the angles about the diurnal axis 81, the latitude axis 82, and the swing axis 84 so as to reproduce a target starry sky. The controller 4 controls the rotation about the diurnal axis 81, the latitude axis 82, and the swing axis 84 based on the obtained values.

In Step S6, the controller 4 makes a determination regarding whether or not the rotation about the swing axis 84 is to be restricted. There is a restriction on the rotation about the swing axis 84 such that the rotation is allowed only in the range of, for example, ±30°. Thus, when the angle about the swing axis 84 is likely to reach ±30°, the control in the azimuth-axis fixed mode cannot be continued. Consequently, the control mode is required to be switched to the swing-axis fixed mode. Accordingly, the controller 4 determines whether or not the angle about the swing axis 84 is likely to reach, for example, ±30°. For example, the controller 4 compares a limit value, which is set to a smaller absolute value as a current angular velocity about the swing axis 84 increases, with a current angle about the swing axis 84. When the current angle about the swing axis 84 exceeds the limit value, the controller 4 determines that the rotation about the swing axis 84 is to be restricted.

In Step S7, the controller 4 determines whether or not the rotation about the swing axis 84 is to be restricted based on the determination made in Step S6. When the rotation about the swing axis 84 is to be restricted, the process proceeds to Step S9. On the other hand, when the rotation about the swing axis 84 is not to be restricted, the process proceeds to Step S8.

In Step S8, the controller 4 determines whether or not the angle between the diurnal axis 81 and the horizontal plane is smaller than a predetermined second value, for example, 70°. When the angle between the diurnal axis 81 and the horizontal plane is not smaller than the second value, the process returns to Step S5. Then, the control in the azimuth-axis fixed mode is continued. On the other hand, when the angle between the diurnal axis 81 and the horizontal plane is smaller than the second value, the process proceeds to Step S9. The second value may be set to a value smaller than the first value so that switching between the swing-axis fixed mode and the azimuth-axis fixed mode is not repeatedly performed at short intervals.

In Step S9, the controller 4 controls the operation of the optical planetarium 10 in the transition mode so that the control mode of the operation of the optical planetarium 10 is switched to the swing-axis fixed mode. Specifically, the controller 4 determines the angle about the swing axis 84 so as to gradually decrease the angular velocity of the rotation about the swing axis 84 while making the angle about the swing axis 84 closer to a target value. Then, the controller 4 calculates the angles about the diurnal axis 81, the latitude axis 82, and the azimuth axis 83 for the reproduction of the target starry sky based on the angle about the swing axis 84. The controller 4 controls the rotation about the diurnal axis 81, the latitude axis 82, the azimuth axis 83, and the swing axis 84 based on the obtained values. In this case, when it is determined in Step S7 that the rotation about the swing axis 84 is likely to reach the limit thereof, the target value of the angle about the swing axis 84 is set to the limit value, for example, ±30°. On the other hand, when it is determined in Step S8 that the angle between the diurnal axis 81 and the horizontal plane is smaller than the second value, the target value of the angle about the swing axis 84 is set to 0° corresponding to an initial state.

In Step S10, the controller 4 determines whether or not the angular velocity of the rotation about the swing axis 84 has become equal to zero and the angle about the swing axis 84 has become equal to the target value, specifically, whether or not the rotation about the swing axis 84 has stopped at the target value. When the rotation about the swing axis 84 has not stopped at the target value, the process returns to Step S9. Then, the control in the transition mode is continued. On the other hand, when the rotation about the swing axis 84 has stopped at the target value, the process returns to Step S1. Then, the control in the swing-axis fixed mode is performed again. In the case in which the angle about the swing axis 84 is fixed to, for example, ±30°, and the control is performed in the swing-axis fixed mode, when the angle between the diurnal axis 81 and the horizontal plane has become sufficiently small, the angle about the swing axis 84 is gradually returned to 0°. The above-mentioned operation is repeated.

Description has been made of the example in which the control is performed so as to prevent the angle between the diurnal axis 81 and the horizontal plane from becoming larger than the predetermined value, i.e., to prevent the angle between the diurnal axis 81 and the azimuth axis 83 from becoming smaller than the predetermined value. However, a control method is not limited to that described above. Similarly, the angles about the diurnal axis 81, the latitude axis 82, the azimuth axis 83, and the swing axis 84 may be controlled so as to keep the angular velocity or the angular acceleration of the rotation about the diurnal axis 81 or the azimuth axis 83 to a value smaller than a predetermined value. Specifically, switching between the swing-axis fixed mode and the azimuth-axis fixed mode may be performed in accordance with the angular velocity or the angular acceleration of the rotation about the diurnal axis 81 or the azimuth axis 83. Also in this case, similar effects are obtained.

Description is now made of a behavior of the related-art modem three-axis type optical planetarium 110 and a behavior of the new four-axis type optical planetarium 10 according to this embodiment when the diurnal motion of a starry sky in the future after 11,000 years from today, which has been described with reference to FIG. 3, is reproduced.

Figure 5A:
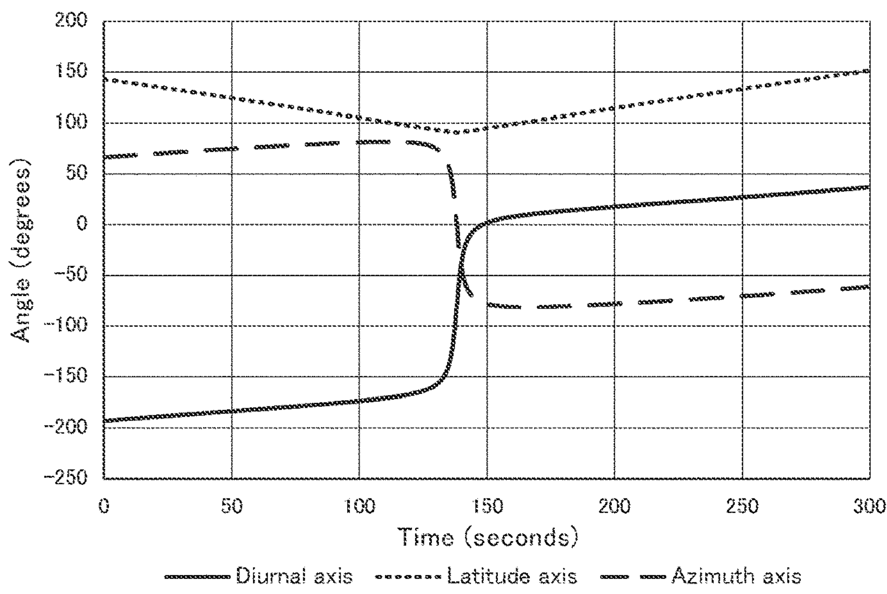
FIG. 5A is a graph for showing an example of changes in angles about a diurnal axis, a latitude axis, and an azimuth axis when a modem three-axis type optical planetarium is used to reproduce diurnal motion of a starry sky in the future after 11,000 years from today.

FIG. 5A is a graph for showing angles about the diurnal axis 181, the latitude axis 182, and the azimuth axis 183 with respect to elapsed time when the diurnal motion is reproduced with use of the related-art modem three-axis type optical planetarium 110. At about 140 seconds when the angle about the latitude axis 182 is approximately 90°, the Polaris 912 passes near the zenith 913. It is understood that the rotation about the diurnal axis 181 and the rotation about the azimuth axis 183 rapidly become faster around the time when the Polaris 912 passes near the zenith 913.

Figure 5B:
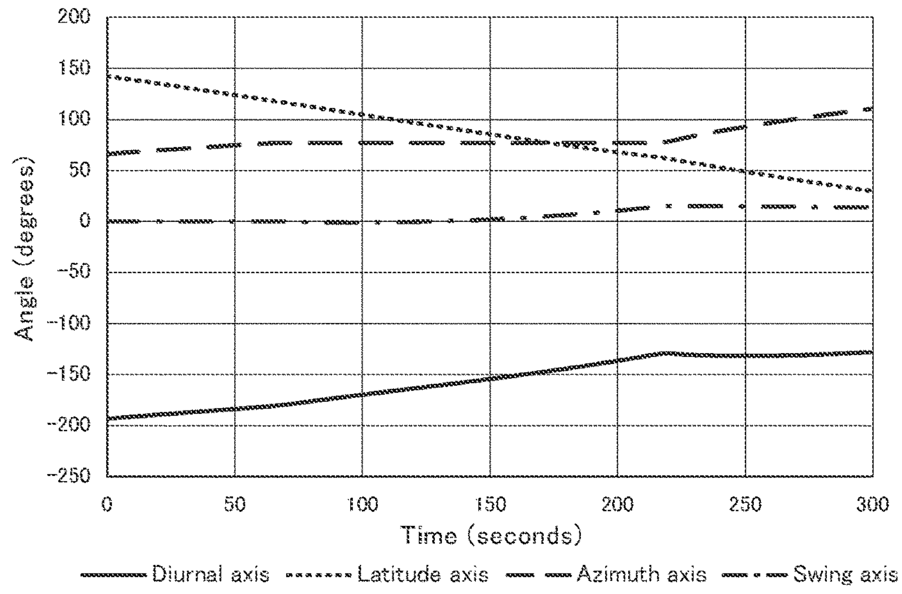
FIG. 5B is a graph for showing an example of changes in angles about a diurnal axis, a latitude axis, an azimuth axis, and a swing axis when a new four-axis type optical planetarium according to one embodiment is used to reproduce diurnal motion of a starry sky in the future after 11,000 years from today.

On the other hand, FIG. 5B is a graph for showing angles about the diurnal axis 81, the latitude axis 82, the azimuth axis 83, and the swing axis 84 with respect to elapsed time when the similar diurnal motion is reproduced with use of the new four-axis type optical planetarium 10 according to this embodiment. Like the case of FIG. 5A, at about 140 seconds, the Polaris 912 passes near the zenith 913. It is understood that, with the new four-axis type optical planetarium 10 according to this embodiment, the rotation about the diurnal axis 81 and the rotation about the azimuth axis 83 do not rapidly become faster even when the Polaris 912 passes near the zenith 913. It is also understood that the rotation about each of the axes is smooth under other conditions.

As described above, the new four-axis type optical planetarium 10 according to this embodiment can operate in two modes, that is, the swing-axis fixed mode and the azimuth-axis fixed mode. In the azimuth-axis fixed mode, the optical planetarium 10 allows Polaris to smoothly move near the zenith through a combination of the rotation about the swing axis 84 and the rotation about the latitude axis 82. Thus, the problem which may otherwise occur at the singular point is not caused. As a result, the optical planetarium 10 can smoothly and appropriately reproduce the movement of stars without causing a sudden rise in rotation velocity about the axis, such as the diurnal axis 81 or the azimuth axis 83, which may otherwise occur only with the swing-axis fixed mode.

In order to allow smooth and appropriate reproduction of any starry sky, the number of axes about which the optical planetarium is rotatable is only required to be increased.

Thus, as described above, similar effects are obtained with use of the classical four-axis type. Meanwhile, as described above, the classical four-axis optical planetarium 210 has a large device size. In contrast, in the new four-axis type optical planetarium 10 according to this embodiment, the swing axis 84 can be added by forming the fork mount 22 in an arc-like shape and mounting the roller bearings along the rail having an arc-like shape. Thus, the optical planetarium 10 is not increased in size as a whole. According to this embodiment, the optical planetarium 10 that is as small and lightweight as the modern three-axis type optical planetarium can be achieved even though the optical planetarium 10 is of the four-axis type.

Another method is conceivable as a method of adding an axis to the modern three-axis type optical planetarium. For example, it is conceivable to add an axis so that the azimuth axis can be swung by inclining all the parts placed on the base as a whole. With such a configuration, however, an azimuth-axis inclination angle changing mechanism is required to be provided to the base, resulting in a larger device size. Accordingly, in this embodiment, a four-axis type device is achieved by fixing the azimuth axis vertically and allowing the latitude axis to be inclined. In particular, as described above in the embodiment, it is preferred that the latitude-axis inclination angle changing mechanism 40 have the following configuration in view of reduction in device size. That is, the swing axis 84 around which the latitude axis 82 rotates is set so as to be orthogonal to the azimuth axis 83 and the latitude axis 82 and to pass through the center of the star ball 11. The fork mount 22 that supports the star ball 11 so that the star ball 11 is rotatable about the latitude axis 82 is provided in a plane containing the latitude axis 82 and the azimuth axis 83. The latitude-axis inclination angle changing mechanism 40 includes the slider 43 provided to the fork mount 22. The slider 43 slides on the rail 41 provided in an arc-like shape with the swing axis 84 as a center.

Description has been made of the reproduction of a starry sky that can be seen from a geographical point at a northern latitude of 37° in the future after 11,000 years as an example. A similar operation is performed to reproduce other motions of celestial bodies. Specifically, when Polaris arranged in the vicinity of the diurnal axis passes near the zenith or the nadir, although the problem described above may occur with the modem three-axis type optical planetarium, the new four-axis type optical planetarium according to this embodiment can prevent the problem. The new four-axis type optical planetarium 10 according to this embodiment operates in the same manner under various conditions, for example, in a case in which a starry sky that can be seen from space is to be projected, and the new four-axis type optical planetarium 10 always enables projection of an appropriate starry sky in such cases.

The preferred embodiment of the present invention is described above, but the present invention is not limited only to the embodiment described above. It goes without saying that various modifications can be made within the scope of the present invention.

What is claimed is:

1. A planetarium system, comprising:

a) an optical planetarium, comprising:

a projector configured to project images of stars;

a diurnal-axis support mechanism configured to allow the projector to rotate about a diurnal axis;

a latitude-axis support mechanism configured to allow the projector to rotate about a latitude axis that is orthogonal to the diurnal axis;

an azimuth-axis support mechanism configured to allow the projector to rotate about an azimuth axis that is set vertically; and a latitude-axis inclination angle changing mechanism configured to allow an angle between the latitude axis and a horizontal plane to be changed within a predetermined range, wherein the latitude-axis inclination angle changing mechanism is provided above the azimuth-axis support mechanism and wherein the latitude-axis inclination angle changing mechanism is configured to allow the latitude axis to rotate about a swing axis that is orthogonal to the azimuth axis and the latitude axis; and b) a controller configured to control angles about the diurnal axis, the latitude axis, the azimuth axis, and the swing axis;

wherein the controller has control modes including:

a swing-axis fixed mode of specifying an angle about the swing axis and calculating angles about the diurnal axis, the latitude axis, and the azimuth axis; and an azimuth-axis fixed mode of specifying an angle about the azimuth axis and calculating angles about the diurnal axis, the latitude axis, and the swing axis, and wherein the controller is configured to control an operation of the optical planetarium while performing switching between the swing-axis fixed mode and the azimuth-axis fixed mode; and wherein, when operating in the azimuth-axis fixed mode, the controller restricts the angle about the swing axis within a predetermined range and switches the control mode to the swing-axis fixed mode before the angle about the swing axis becomes larger than or smaller than the predetermined range.

2. A planetarium system, comprising:

a) an optical planetarium, comprising:

a projector configured to project images of stars;

a diurnal-axis support mechanism configured to allow the projector to rotate about a diurnal axis;

a latitude-axis support mechanism configured to allow the projector to rotate about a latitude axis that is orthogonal to the diurnal axis;

an azimuth-axis support mechanism configured to allow the projector to rotate about an azimuth axis that is set vertically; and a latitude-axis inclination angle changing mechanism configured to allow an angle between the latitude axis and a horizontal plane to be changed within a predetermined range, wherein the latitude-axis inclination angle changing mechanism is provided above the azimuth-axis support mechanism and wherein the latitude-axis inclination angle changing mechanism is configured to allow the latitude axis to rotate about a swing axis that is orthogonal to the azimuth axis and the latitude axis;

and b) a controller configured to control angles about the diurnal axis, the latitude axis, the azimuth axis, and the swing axis;

wherein the controller controls angles about the diurnal axis, the latitude axis, the azimuth axis, and the swing axis so that an angle between the diurnal axis and the azimuth axis is larger than a predetermined value.

3. A planetarium system, comprising:

a) an optical planetarium, comprising:

a projector configured to project images of stars;

a diurnal-axis support mechanism configured to allow the projector to rotate about a diurnal axis;

a latitude-axis support mechanism configured to allow the projector to rotate about a latitude axis that is orthogonal to the diurnal axis;

an azimuth-axis support mechanism configured to allow the projector to rotate about an azimuth axis that is set vertically; and a latitude-axis inclination angle changing mechanism configured to allow an angle between the latitude axis and a horizontal plane to be changed within a predetermined range, wherein the latitude-axis inclination angle changing mechanism is provided above the azimuth-axis support mechanism and wherein the latitude-axis inclination angle changing mechanism is configured to allow the latitude axis to rotate about a swing axis that is orthogonal to the azimuth axis and the latitude axis;

and b) a controller configured to control angles about the diurnal axis, the latitude axis, the azimuth axis, and the swing axis;

wherein the controller controls angles about the diurnal axis, the latitude axis, the azimuth axis, and the swing axis so that an angular velocity or an angular acceleration of rotation about the diurnal axis or the azimuth axis is less than a predetermined value.

* * * * *